Aug. 21, 1962  W. J. ALSPACH ET AL  3,049,917
FLOWMETER
Filed May 28, 1959
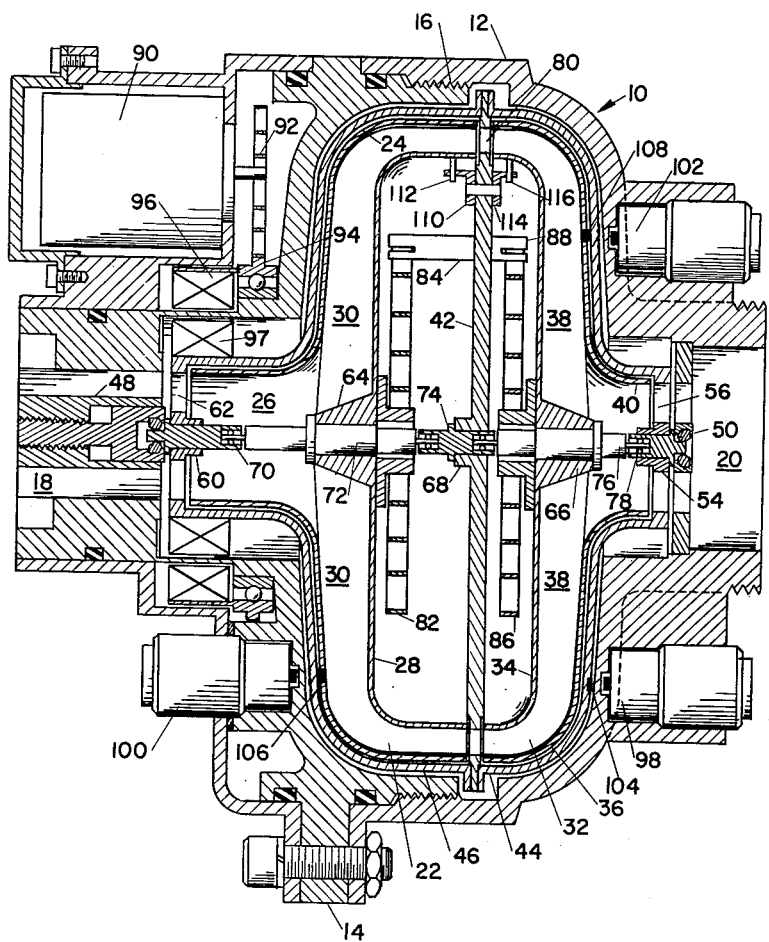
INVENTORS.
WALLACE J. ALSPACH
IRVING B. COOPER
BY
ATTORNEY

# United States Patent Office 3,049,917
Patented Aug. 21, 1962

3,049,917
FLOWMETER
Wallace J. Alspach, Davenport, Iowa, and Irving B. Cooper, Jr., Marblehead, Mass., assignors to The Bendix Corporation, a corporation of Delaware
Filed May 28, 1959, Ser. No. 816,469
6 Claims. (Cl. 73—194)

This invention relates to improvements in mass rate flow meters and more particularly to a Coriolis type mass rate flowmeter.

The invention has as one of its objects the provision of an improved flowmeter employing the Coriolis principle utilizing the advantages made possible by that principle.

Another object of the invention is to provide an improved flowmeter capable of providing equally sensitive and accurate mass rate of fluid flow indication over the entire range of the meter.

A further object of the invention is to provide an improved duo-range flowmeter capable of providing equally accurate and sensitive mass rate of fluid flow indications in both ranges.

A still further object of the invention is to provide an improved flowmeter capable of measuring mass rate of fluid flow in both the forward and reverse directions.

A still further object of the invention is to provide a duo-range flowmeter capable of measuring mass rate of fluid flow over the entire range in one direction and over one of the ranges in the second direction.

A still further object of the invention is to provide a structure in which these advantages can be obtained by relatively standard and not unduly complicated manufacturing techniques.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be construed as defining the limits of the invention.

The single figure of the drawing is a view in central section of a flowmeter embodying the invention.

The flowmeter shown in the drawing comprises a housing, a pair of fluid impellers for accelerating and decelerating fluid respectively, impeller drive apparatus and elastic means for interconnecting the impellers and driving apparatus whereby the impellers may be relatively angularly displaced from the drive apparatus in accordance with the product of the magnitude of the acceleration or deceleration of the fluid and the stiffness of the elastic connection. The degree of relative displacement of the impellers from the drive apparatus is proportional to the mass rate of flow and means are provided for generating signals variable as a function of the degree of such relative rotation.

Advantageously, as shown, the housing 10 comprises right 12 and left 14 bell-shaped shells joined by a threaded connection 16 to form a fluid flow path including axially aligned flow openings 18 and 20, in shells 14 and 12 respectively, leading to a central cavity of enlarged diameter defined by the interior walls of the housing 10.

The two impellers are rotatably disposed within this cavity. Impeller 22 comprises an outer bell-shaped shell 24 the smaller end of which is provided with an opening 26. Impeller 22 further comprises an inner shell 28 disposed within shell 24 and held in concentrically spaced relation therewith by a plurality of spaced, radially extended vanes 30 whose edges are joined to shells 24 and 28 to form flow paths for fluid between the shells and opening at one end at opening 26 of shell 24 and terminating at the other end at the outer periphery of the impeller.

Similarly, the right impeller 32 comprises concentrically arranged inner and outer shells 34 and 36 respectively joined by impeller vanes 38.

The impellers 22 and 32 are rotatable about their common axis, the axis of flow openings 18 and 20, whereby fluid flowing into opening 18 and passing into impeller 22 by opening 26 flows between the impeller vanes 30 where it is accelerated radially outwardly upon rotation of the impeller so that it has high velocity when its direction of movement is changed parallel to the axis of the impeller rotation at the outer periphery of the impeller. Upon emerging from impeller 22, and traversing openings in a drive plate to be explained later, the fluid enters into the right impeller 32 between impeller vanes 38 where its direction is changed causing it to flow radially inward and then emerging from the impeller at axial opening 40 formed at the small end of shell 36 from whence the fluid emerges to the flow opening 20.

The drive plate 42 comprises a disk disposed between impellers 22 and 32 and joined at its outer periphery to a first bell shaped cage member 44 and a second cage member 46. The cage member 44 is disposed between impeller 36 and the housing shell 12; the other cage member 46 is disposed between impeller 22 and housing shell 14. These cage members and disk 42 are rotatable within housing 10 on an axis common to the axis of rotation of the shells 22 and 32.

The cage members 44 and 46, drive plate 42 and impellers 22 and 32 are mounted for rotation within housing 10 in the following manner. Axially disposed in opening 18 is a bearing assembly 48 comprising a central bearing hub and radially spaced vanes or spokes abutting the walls of the shell housing 14 which form the flow opening 18. Axially disposed in opening 20 is a bearing support member 50 comprising a central hub, flow straightening vanes or spokes extended radially outwardly from the central hub to a supporting ring placed into and engaged with the wall of housing shell 12 which defines opening 20. The small end of cage member 44 terminates in an end wall slotted to form a central hub connected by spokes or vanes to its side walls. The small end of cage member 44 terminates in an end wall slotted to form a central hub connected by spokes or vanes to its side walls. The small end of cage member 46 is similarly constructed to form a hub member 60 and vanes or spokes 62. The inner shell 28 of impeller 22 is provided with a central hub 64 and the inner shell 34 of impeller 32 is provided with a central hub 66. The drive disk 42 has a central hub 68. A shaft 70 fixed in hub 60 of cage member 46 is rotatable in the hub assembly 48. A left impeller shaft 72 fixed to the hub 64 of the left impeller 22 is rotatable in the bearing opening in shaft 70. The opposite end of shaft 72 is rotatable in a bearing formed within a shaft 74 fixed in hub 68 of drive plate 42. The left end of a shaft 76, fixed in hub 66 of impeller 32, is rotatable in a bearing formed in the other end of shaft 74. The right end of shaft 76 is rotatable in a bearing formed in a shaft 78 fixed in hub 54 at the small end of cage member 44. Finally, shaft 78 is rotatable in hub member 50.

In the structure thus far described, the drive cage assembly comprising cage members 44 and 46 and drive plate 42 is rotatable in bearing hubs 48 and 50. Impellers 22 and 32 are rotatable independently of one another, and of the driving cage assembly, in bearings formed in shafts 70, 74, and 78 carried by the cage assembly. Fluid may flow through the meter through opening 18, between the flow straightening vanes of spokes of hub member 48, between the spokes or vanes 62 of the left cage member, through opening 26 and between vanes 30 of the left impeller 22, through flow passages 80 formed through the drive plate 42, through right impeller 32 between vanes 38 and its opening 40, thence through the small end of cage 44 at the opening 56, the opening formed by the flow straightening vanes or spokes of bearing support 50 and flow opening 20.

Spring 82 is fixed to inner shell 28 of impeller 22, said spring having its open end connected to drive plate 42 by means of support 84. Similarly, spring 86 is fixed to inner shell 34 of impeller 32, said spring having its open end connected to drive plate 42 by means of support 88. Springs 82 and 86 act as a balancing force against the force acting on impellers 22 and 32 by reason of the fluid passing therethrough.

An electric motor 90, held in a recess formed in the drive housing secured under the end of housing shell 14 operates to turn a gear 92 which rotates a second gear 94 which is formed at the outer face of a ball bearing assembly and is press fitted within a cylindrical side extension of gear 94. A ring magnet 96 is magnetically coupled through the non-magnetic wall of housing shell 14, which is made thin at that point, to a second ring magnet 97 which is press fitted under the small end of the left cage member 46. Accordingly, rotational operation of motor 90 results in corresponding rotation of the cage driven assembly including drive plate 42. The latter has elastic connection to each of impellers 22 and 32.

Advantageously, as shown, the drawing includes a time base pick-up system which is described in the pending application Serial No. 705,986 of Irving B. Cooper, Jr., filed December 30, 1957.

Generally, the pick up system includes three pulse reference pick-ups, 98, 100, and 102, which are activated by reference magnets 104, 106, and 108, respectively. Reference magnet 104 is affixed to cage member 44, reference magnet 106 is affixed to impeller 22, and reference magnet 108 is affixed to impeller 32.

Advantageously means are provided for limiting the rotation of impellers 22 and 32 relative to cage member 46. Limit stop 110 is fixed to disk 42 of cage member 46, removable pin 112 is disposed in impeller 22 for engagement with the limit stop 110. Similarly, disk 42 is provided with limit stop 114 and impeller 32 is provided with removable pin 116.

In operation of the flowmeter, electric motor 90, through gears 92 and 94 and ring magnets 96 and 97, initiates rotational movement to the associated cage member 46, drive plate 42 and cage member 44. For the purpose of illustration of the operation of the flowmeter, rotation of drive plate 42 will be considered to be counterclockwise when looking into flow opening 18. Impellers 22 and 32 are given the same rotational motion of drive plate 42 by means of their connection to the drive plates 42 by torque springs 82 and 86.

In the flowmeter illustrated, the range of the meter may be made coextensive in the measurement of flows in both directions either by employing torque springs 82 and 86 having like spring rates or, if the spring rates are not alike, by modifying the response of the electrical sensing system to the duration of the measured time intervals.

Fluid enters flow opening 18 and passes through vanes 62 of case member 46 and into vanes 30 of impeller 22. The fluid moves radially outward through vanes 30, then passes through flow passages 80 of drive plate 42 into impeller 32 where it is rotated radially inward and through vanes 56 and out of the flowmeter through opening 20. As a result of this fluid flow, momentum is imparted to the fluid by rotating impeller 22 which acts as a force on the impeller 22 causing it to lag behind cage member 44 and 46 and drive plate 42 at an angle porportional to the fluid flowing through the flowmeter in mass units. The spring 82 acts as a balancing force. Impeller 32 would tend to remove momentum from the fluid and therefore lead cage members 44 and 46 and drive plate 42 but is prevented from so doing by limit stop 114 and pin 116. Electrically, when flow through impeller 22 is measured, the mass rate of flow is represented by the duration of the interval between the time when magnet 104 passes pick-up 98 and the time when magnet 106 passes pick-up 100.

Similarly, fluid flowing through the meter in the reverse direction, into flow opening 20 and through the flowmeter to flow opening 18 will operate in the same manner as described above with the reverse effects on the impellers 22 and 32. Impeller 32 will lag behind cage members 44 and 46 and drive plate 42 and impeller 22 will lead the cage members and drive plate were it not for limit stop 110 and pin 112. Electrically, when flow through impeller 32 is to be measured, the mass rate of flow is represented by the duration of the interval between the time when magnet 104 passed pick-up 98 and the time when magnet 108 passes pick-up 102.

If an operation is desired where added sensitivity is to be obtained over a wide range of fluid flow pin 116 may be removed. This will provide a duo-range meter in one direction of fluid flow and a single range in the reverse direction. The advantages of this type of meter may be illustrated by means of an example wherein the flowmeter is to be used in the fuel line of an aircraft. When fuel is passing from the tanks of the aircraft to the power plant through the flowmeter from fluid opening 18 to fluid opening 20, impeller 22 will be used for the low range and impeller 32 will be used for the high range of fluid flows. Upon reverse flow through the flowmeter, impeller 32 will be used for the high range and impeller 22 will give no indication because of limit stop 110 and pin 112.

In operation of the flowmeter with pin 116 removed rotational movement is imparted to the meter elements as described above. Springs 82 and 86 may have different spring rates.

Fluid enters flow opening 18 passing through vanes 62 of case member 46 and into vanes 30 of impeller 22. The fluid moves radially outward through vanes 30, the passes through flow passages 80 of drive plate 42 into impeller 32 where it is rotated radially inward and through vanes 56 and out of the flowmeter through opening 20. As a result of this fluid flow, momentum is imparted to the fluid by rotating impeller 22 which acts as a force on the impeller 22 causing it to lag behind cage members 44 and 46 and drive plate 42 at an angle proportional to the fluid flowing through the flowmeter in mass units, the spring 82 acting as a balancing force. The impeller 32 acts in a similar manner but removed momentum from the fluid resulting in impeller 32 leading cage member 44 and 46 and drive plate 42 at an angle proportional to the fluid flowing through the flowmeter in mass units. The spring 86 acts as a balancing force. Electrically, the mass rate of flow is represented by the duration of the interval between the time when magnet 104 passes pick-up 98 and the time, when flow through impeller 22 is measured, when magnet 106 passes pick-up 100 and when flow is measured through impeller 32, when magnet 108 passes pick-up 102. The time duration is independent of the speed of impeller rotation.

Similarly when the fluid flows through the flowmeter in the reverse direction, into flow opening 20 to flow opening 18, impeller 32 will lag behind cage members 44 and 46 and drive plate 42 and impeller 22 will lead the cage members and drive plate were it not for limit stop 110 and pin 112. Electrically, no additional pick-ups are necessary and the time duration, as indicated by the interval between pulses from pick-ups 98 and 102 is directly proportional to the flow rate in mass units. Because impeller 22 does not lead the cage members 44 and 46 and drive plate 42, pick-up 100 will pulse at the same time as pick-up 98.

Any suitable one of several available time interval measuring devices may be employed to measure the duration between the signals from pick-ups 98, 100, and 102 and to indicate that duration in units of mass flow rate.

While the flowmeter as shown in the drawing is of the construction shown and described, it is understood that the instant invention is not limited to any particular form or construction. Moreover, other changes and modifications of the novel flowmeter contemplated herein may be made by those skilled in the art without departing from the scope of the instant invention.

We claim:

1. A mass flowmeter comprising a housing defining a flow path, first and second rotatable impellers disposed in series in said flow path, the first arranged to accelerate flow in a radial direction and the second arranged to decelerate said flow, drive means including a rotatable drive element and individual elastic coupling elements each connected between said drive element and a respectively associated one of said impellers permitting rotational displacement between said drive element and said impellers, and means to measure the amount of said rotational displacement.

2. A Coriolis mass rate of flow meter comprising a housing defining a flow path, first and second rotatable impellers disposed in series in said flow path, the first arranged to accelerate flow in a radial direction and the second arranged to decelerate said flow, drive means including a rotatable drive element and individual elastic coupling elements of different elasticity each connected between said drive element and a respectively associated one of said impellers permitting rotational displacement between said drive element and said impellers, and means to measure the amount of said rotational displacement.

3. The invention defined in claim 2 including means for preventing said first rotatable impeller from leading said rotatable drive element.

4. The invention defined in claim 3 in which said means for preventing includes means carried by said first rotatable impeller and said rotatable drive element interconnecting said impeller and drive element for preventing said first rotatable impeller from leading said rotatable drive element.

5. A Coriolis mass rate of flow meter comprising a housing defining a flow path, first and second rotatable impellers disposed in series in said flow path the first arranged to accelerate the flow in a radial direction and the second arranged to decelerate said flow, drive means including a rotational drive element and individual elastic coupling elements of similar elasticity each connected between said drive element and a respectively associated one of said impellers permitting rotational displacement between said drive element and said impellers, means for preventing said first and second rotatable impellers from leading said rotatable drive element irrespective of the direction of fluid flow through said flow path, and means to measure the amount of said rotational displacement.

6. The invention defined in claim 5 in which said means for preventing includes interconnecting means carried by said first and second rotatable impellers and said rotational drive element for preventing said first and second rotatable impellers from leading said rotatable drive element.

References Cited in the file of this patent

UNITED STATES PATENTS 2,832,218 White _____ Apr. 29, 1958

FOREIGN PATENTS 740,037 Great Britain _____ Nov. 9, 1955

OTHER REFERENCES

Article entitled: "A Fast-Response True-Mass-Rate Flowmeter," by Yao Tzu Li et al. ASME Transactions, July 1953, pages 835–841. Classified 73–194 M.